April 24, 1928.                                            1,667,566
G. G. RUPERT
DROWNING RING FOR ANIMAL TRAPS
Filed Feb. 23, 1927

INVENTOR
George G. Rupert
BY
ATTORNEY

Patented Apr. 24, 1928.

1,667,566

UNITED STATES PATENT OFFICE.

GEORGE G. RUPERT, OF DECATUR, ILLINOIS.

DROWNING RING FOR ANIMAL TRAPS.

Application filed February 23, 1927. Serial No. 170,079.

This invention relates to a new and useful device in the nature of a drowning ring, for use in connection with animal traps, adapted to drown the animal caught in the said trap.

The object of the invention is to provide a drowning ring of novel construction and arrangement of parts, hereinafter more fully described, claimed and illustrated in the accompanying drawing, in which:—

Figure 1:
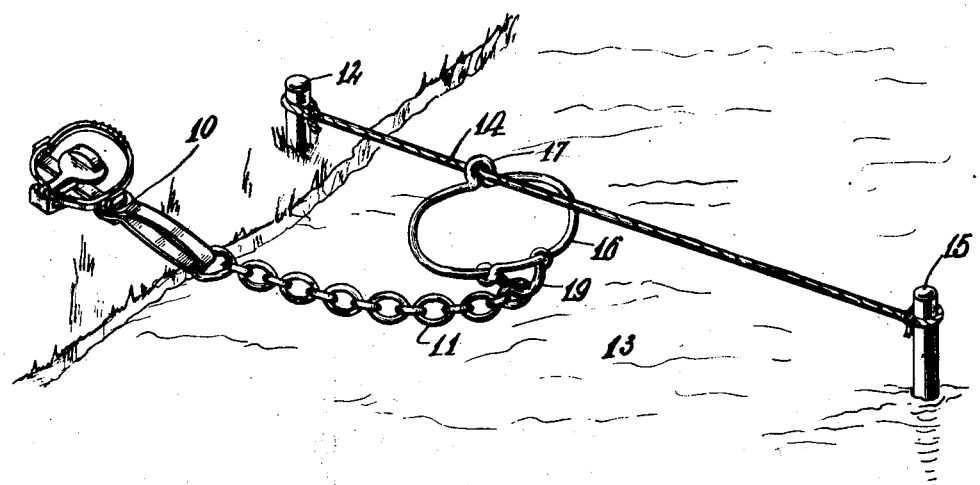
Fig. 1 shows a perspective view of my improved drowning ring attached to an animal trap, as same would appear when in use.

The animal trap 10, such as ordinarily used to catch animals by the foot, which seldom kills the said animal, is provided with the usual chain 11, attached thereto, and depending therefrom.

The stake 12 is driven into the ground, adjacent to, or at the edge of a body of water 13. The flexible member 14, preferably rope, is attached to the stake 12, and is extended therefrom, and is attached to the stake 15, driven into the bed of the body of water 13, any desired distance from the stake 12.

As here embodied my improved drowning ring comprises a ring member 16, formed or bent, preferably of heavy wire. The ring member 16, is provided with a loop element 17, formed or bent at right angles thereto, and adapted to receive the above mentioned flexible member 14, which is extended through the said loop element 17.

The ring member 16, is formed or bent at its extremities, as at 19, so as to form a loop element substantially in the same plane as the ring member 16. The above mentioned chain 11, is attached at its extended extremity to the loop element 19 of the ring member 16.

It should be understood that at the base of the loop 17, the bent portions 16' and 17' are substantially adjacent each other and that when the ring is moved in the direction of the bank of the stream, as shown in Fig. 1, the flexible cord 14 will be clamped between these adjacent portions. The clamping action is produced by the rotation of the ring which is effected by the pull of an animal on the chain 11. When the animal pulls in the direction of the bank the ring is rotated anticlockwise as shown in Fig. 1, and the cord is pinched between the bent portions 16' and 17', but when the animal pulls in the opposite direction, the ring is rotated anticlockwise releasing the grip on the cord.

The above described construction is such as will permit an animal caught in the trap 10, to move or run only in the direction of the body of water 13, so as to drown the said animal, which might otherwise work loose from the trap 10 and escape.

It is obvious that should the said animal attempt to run away from the body of water 13, that the loop portion 17 of the ring member 16, will bind on the flexible member 14, and prevent the animal from doing so.

Figure 2:
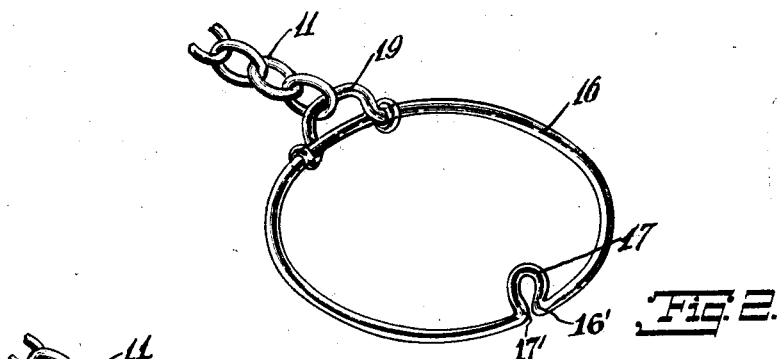
Fig. 2 shows an enlarged perspective detail view of my improved drowning ring.
Figure 3:
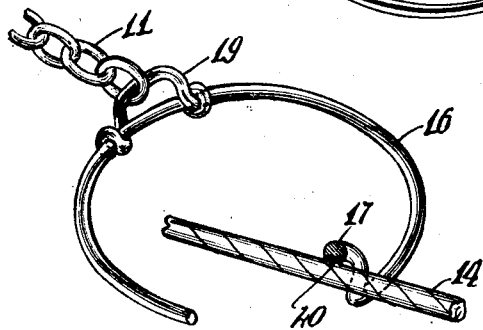
Fig. 3 shows a fragmentary perspective detail view of a modification of my improved drowning ring.

In Fig. 2, of the accompanying drawing, I have shown the loop portion 17 provided with a serrated inner surface 20, so as to form a plurality of teeth, adapted to securely grip the flexible member 14, should the animal caught in the trap 10, attempt to run away from the body of water 13.

Having thus described my invention, what I claim as new and desire to protect by Letters Patent of the United States is as follows:

1. A drowning ring for animal traps comprising a main ring, a loop connected with said ring, disposed substantially in the same plane thereof for attaching a trap thereto, and a loop on said ring opposite from said first mentioned loop formed substantially at right angles to the plane of said ring comprising side portions converged substantially adjacent each other at their base, said converging side portions being adapted to clamp a flexible cord threaded through said last mentioned loop when said ring is moved in a predetermined direction.

2. In an animal trap, the combination with a trap proper, of a chain attached to said trap, a drowning ring attached to the other end of said chain comprising a ring having a loop made integral therewith and disposed in a plane perpendicular thereto, the base of the sides of said loop being disposed substantially adjacent to each other, and a flexible cord threaded through said loop and attached at one end to a peg driven into the bank of a stream and at the other end to a peg driven into the bed of the stream, said ring being adapted to be rotated when an animal pulls the trap away from the stream for forcing said cord between the adjacent base portions of said loop to restrain movement of said trap away from said stream and to be rotated in an opposite direction when said trap is moved in the direction of the stream for releasing said cord to permit the trap to move freely.

3. A drowning ring for animals comprising a ring proper, and a loop made integral with said ring, and disposed substantially perpendicularly thereto, having converging sides substantially adjacent to each other at their base, the base portions of said loop being adapted to clamp a flexible cord when said ring is moved in one direction and to release its grip on a cord when moved in the opposite direction.

In testimony whereof I have affixed my signature.

GEORGE G. RUPERT.